Feb. 8, 1955 C. J. SCHILLING ET AL 2,701,710
FRACTIONATING COLUMN
Original Filed Sept. 28, 1945 2 Sheets-Sheet 1

C. J. SCHILLING
L. S. TWOMEY
INVENTORS

ATTORNEY

C. J. SCHILLING
L. S. TWOMEY
INVENTORS

ATTORNEY

United States Patent Office 2,701,710
Patented Feb. 8, 1955

2,701,710

FRACTIONATING COLUMN

Clarence J. Schilling, Allentown, Pa., and Lee S. Twomey, Vista, Calif., assignors to Air Products, Incorporated, a corporation of Michigan Original application September 28, 1945, Serial No. 619,110. Divided and this application August 11, 1949, Serial No. 109,657

7 Claims. (Cl. 261—114)

The present invention relates generally to fractionating columns and more specifically to means for subdividing a stream of liquid to be contacted with gas in a column into a plurality of streams of which the volumes are substantially equal.

This application is a division of an application entitled "Fractionating Columns" filed by Clarence J. Schilling and Lee S. Twomey on September 28, 1945, under Serial No. 619,110. The present application contains only that portion of the original specification which is relevant to liquid distributing means.

An object of the invention is to provide means for distributing one or more of the liquid feeds to an air or gas fractionating column among a plurality of noncommunicating bubbling wells formed on or in a fractionating plate.

An object of the invention is to provide a simple and effective means for subdividing a single stream of a liquid into a plurality of streams of equal volume or of predetermined volumetric relation, and in which the divided or lesser streams will maintain a constant volumetric relation regardless of variations in the volume of the supplying stream.

An object of the invention is to provide a stream-subdividing means having the characteristics above described, together with means for maintaining the distributing orifices free from solids carried in suspension and which otherwise tend to accumulate in the orifices and disturb the desired volumetric relation between the plural streams.

Modern liquid fractionation is performed, almost without exception, in bubble plate columns. In their conventional form, these columns flow the reflux liquid across the plate and around all the bubble caps fixed in it. In columns even of small diameter and having a correspondingly small number of caps per plate, much difficulty is experienced in producing even flow and distribution of the reflux liquid, without which the highest efficiency cannot be attained. As the diameter of the plate increases, the efficiency of the plate tends to decrease, by reason of poorer liquid distribution over its area. If for any reason, as for example buckling of the plate or settling of the column, the plate departs appreciably from a horizontal plane, its efficiency falls off very rapidly and the plate becomes nonfunctional when the departure from horizontality is only a few degrees.

Further, in very large columns the plates usually employed have an efficiency somewhat lower than those in smaller units, because of the hydraulic gradient needed to cause the liquid to flow at the necessary velocity across a wide plate. This results in a liquid depth disadvantageously greater at the upstream than at the downstream edge of the plate. Through the employment of the invention herein described, the plate may be divided into a number of sections, as regards liquid flow, of such dimensions as in large measure to avoid differences in depth and the resultant lowering of efficiency, avoiding the necessity for constructing a number of smaller complete columns.

The invention comprises a novel form of fractionating column proper in which the plates are provided with a plurality or multiplicity of pockets or wells, each feeding reflux liquid without redistribution into a well in the plate next below, in combination with a novel and effective means for distributing the liquid feed or supply stream among the wells on the uppermost plate and with certain accessories which tend to maintain the desired distribution unimpaired and which permit the distributing device to be flushed out with only a momentary interruption to the functioning of the column.

The invention will best be understood with reference to the attached drawings and the following description thereof, in which.

Figure 1:
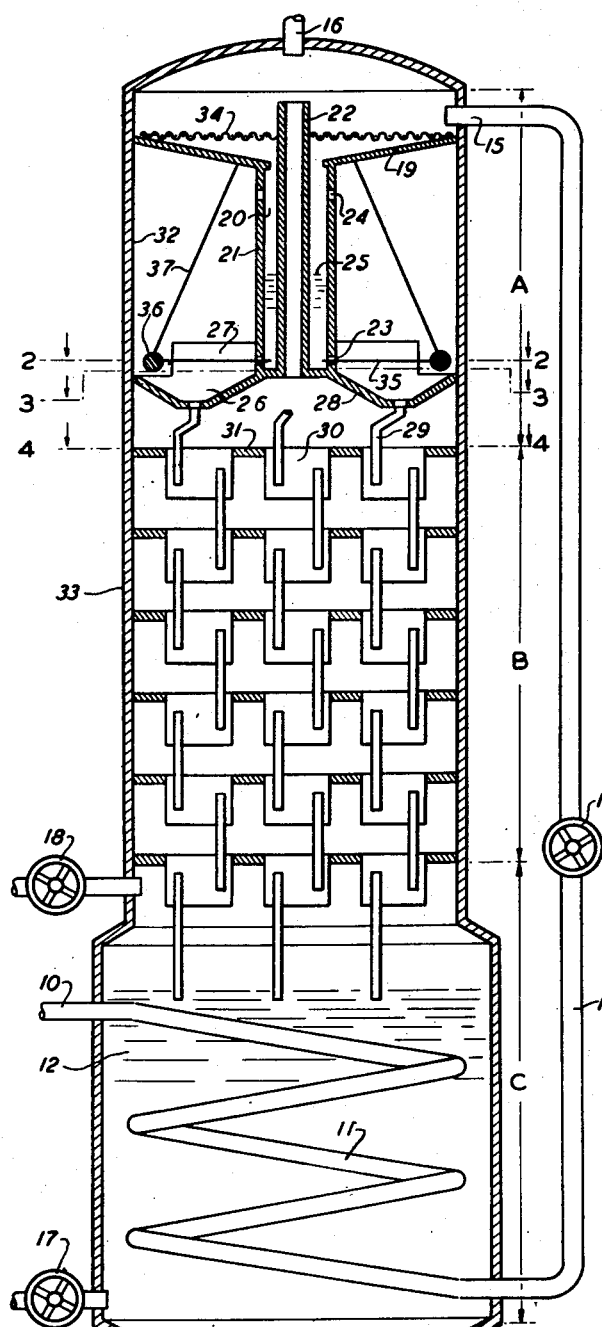
Fig. 1 is a vertical section through a single-stage air fractionating column embodying the basic features of the invention.

Referring first to Fig. 1, the invention is illustrated in this figure as applied to a single-stage fractionating column, such as is often used in the fractionation of liquid air. This column consists of three functionally distinct sections: the distributing section A, the fractionating section B and the reboiling section C. The invention resides in the distributing section and in the structure and arrangement of plates in the fractionating section, the reboiling section being conventional.

Air previously compressed, dried and precooled by means not shown is introduced at 10 into a boiling coil 11 immersed in a bath 12 of liquid oxygen. In this coil, the air is liquefied in supplying heat to the oxygen bath which is thus continuously boiled. The liquid air then passes through a conduit 13 and an expansion valve 14 by which it is brought to a lower pressure. The expanded liquid, together with any vapor evolved due to pressure reduction, are introduced into the upper end of the column as at 15, the liquid descending over and through the plates in a manner to be described. The vapor flashed off by pressure reduction, together with that separated by fractionation on the plates, escapes from the upper end of the column as at 16; this is a nitrogen-rich vapor usually referred to as "gaseous nitrogen" though it is never entirely pure. The oxygen separated by the plates in a desired purity and usually referred to as "product oxygen" is withdrawn from the lower end of the column, either as a liquid at 17 or as a vapor at 18, as may be preferred. To this point, the structure and steps described are well known and are no part of the instant invention.

The liquid entering the column at 15, being liquid air enriched in oxygen, descends over a funnel-shaped member 19 into an annular feed well 20, formed by concentric spacing of a feed tube 21 and a nitrogen vent tube 22. The feed tube is provided with a lower ring of metering perforations 23 and with an upper ring of overflow perforations 24. The size of the metering perforations is so adjusted (in the construction of the apparatus) that the liquid level 25 will lie below perforations 24 during normal operation, these openings being provided as a spillway in the event of flooding of the feed tube. The number of openings 24 is immaterial and one will suffice if of sufficient area to care for the maximum flow. It is preferable that the liquid level should lie above the metering perforations with the feed stream at normal size.

The liquids flowing through the individual perforations 23 of the lower ring pass into corresponding compartments 26 formed by the insertion of partitions 27 in a ring-shaped tray 28. Each of these compartments is provided with a drain tube 29 extending into one of the bubbling wells 30 in the uppermost fractionating plate 31. The tray is illustrated as attached both to the feed tube and to the inner wall 32 of column shell 33, and the drain tubes are illustrated as sealing in liquid in the bubbling wells. Both of these arrangements are matters of convenience only, as the tray may be supported in any desired manner and the drain tubes may, if preferred, be provided with individual sealing cups or even left unsealed.

The structure just described will divide a liquid feed stream (using that word in the sense of any stream which is fed onto a fractionating plate, regardless of its origin) into any desired number of individual or lesser streams which will have a substantially constant volumetric relation. Ordinarily the perforations will have the same net area and will deliver substantially equal streams. By reason of the relatively small diameter of the liquid column in the feed tube, the hydraulic head on perforations occurring on opposite sides of the tube differs only very slightly even when the column is inclined. It is possible and might under some circumstances be advantageous to give the perforations different net areas to supply streams of different volumes, the volumetric relationship of which would be constant.

It has been found that small orifices, such as those indicated at 23, are liable to reduction in area or to stoppage by accumulation of ice crystals (for example, of water or carbon dioxide), particularly if the arrangements for caustic washing and drying of the air supply are not fully effective. The supply stream may also contain foreign matter such as pipe scale, metallic oxides, etc., which tend to restrict or to bridge the perforations and throw the distribution out of balance. If this condition is anticipated, it is desirable to place a fine screen 34 over the top of funnel 19 to stop the larger particles.

As a further precaution, such fine sediments as may pass the screen and tend to accumulate in the perforations may be dislodged and carried through by vibrating or reciprocating a solid body within the orifice. Fig. 1 shows an arrangement for this purpose which is adapted to use in truck-mounted or shipboard columns which, in their use, are subjected to vibration or oscillation. This device consists of a number of wires 35, preferably resilient, projected through the perforations from a suspended ring 36. This ring is swingingly supported from funnel 19 or feed tube 21 by light rods 37 which may well be looped at their ends. The wires are of less diameter than the perforation and remain within it, and are considered in figuring the net area of the remaining annular orifice.

The vibration of apparatus mounted on a truck or the swaying motion to which a shipboard column is subject cause ring 36 to swing relative to the column through small arcs and the wires to vibrate and also to reciprocate through short distances, keeping the orifices free from sediments. The wires are also subjected to vibration by the flow of liquid around them. In the case of stationary columns, not subject to movement due to transportation or water support, a similar arrangement may be used if mechanical provision is made for imparting a vibratory or oscillatory movement to the ring by power or by the hand of the operator through a suitable seal. Or a solid body may be passed through and withdrawn from each orifice at intervals, as described in connection with Fig. 5 to follow.

Figure 5:
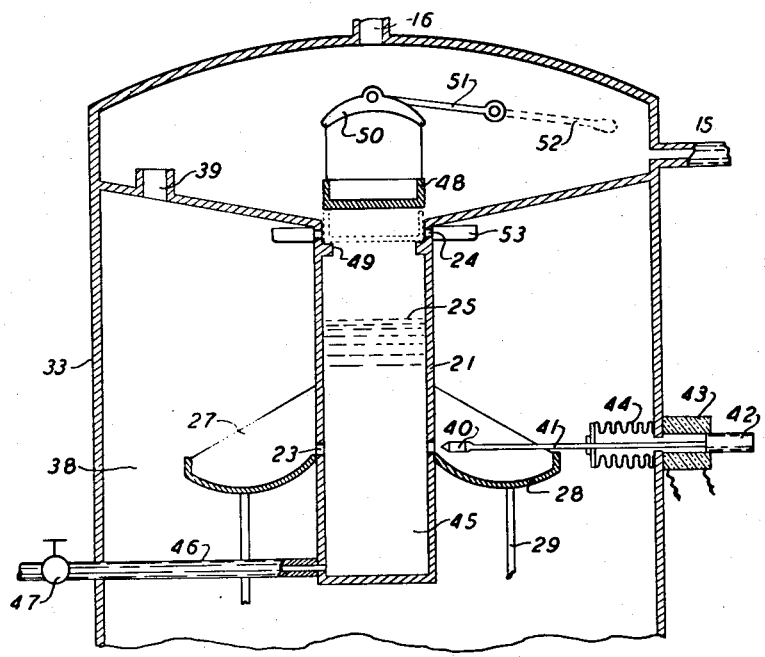
Fig. 5 is a vertical section through the upper end of a column, illustrating certain modifications of and additions to the details shown in Fig. 1.
Figure 2:
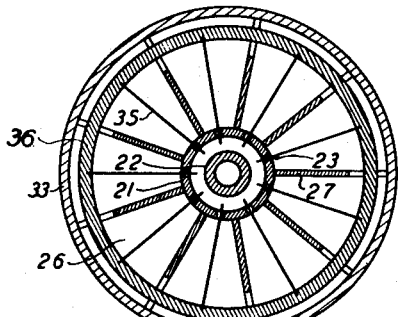
Fig. 2 is a plan section through the upper end of the column, as on the line 2—2 of Fig. 1.
Figure 3:
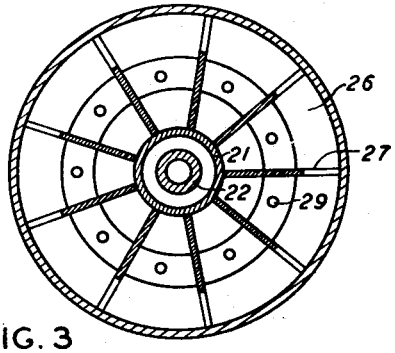
Fig. 3 is a plan section through the column at the level indicated at 3—3 of Fig. 1.
Figure 4:
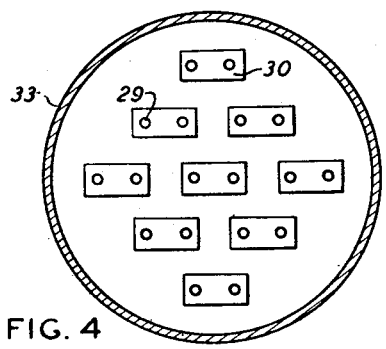
Fig. 4 is a plan section through the column at the level indicated at 4—4 of Fig. 1.

Fig. 5 illustrates several variations from the structure above described. Thus, the tray 28 is attached only to the feed tube or chamber 21 leaving an annular space 38 for the upward passage of vapor. This permits nitrogen vent tube 22 to be dispensed with, a flanged opening 39 being provided in its stead for the passage of vapor through the funnel. These particular variations are unimportant and merely indicative of numerous ways in which the structure of Fig. 1 may be varied within the scope of the invention, but others are of more importance.

This figure illustrates a form of orifice clearing mechanism especially adapted to use in large stationary columns. In this form, each perforation 23 is provided with a clearing plug 40 which is of such size as just to pass through the orifice and is preferably pointed for guidance into the orifice. A wire brush may be used instead of the solid plug if preferred. Element 40 is carried by a rod 41 which in turn is fixed in the armature 42 of a solenoid 43. Either inside or outside the column shell 33 is a Sylphon bellows 44 into the free end of which the rod or armature is sealed to prevent escape of vapor. On energizing the solenoid, the armature is drawn into the coil and the plug or brush 40 is passed through the orifice, clearing away accumulations of sediment, the plug being withdrawn when the solenoid circuit is broken. The solenoids, if more than one is used, may be connected in parallel for simultaneous actuation through a hand switch or they may be actuated in rotation by any automatic timing switch.

This orifice clearing mechanism replaces the ring 36 and the vibrating wires 35 of the form of Fig. 1 and is intended to be illustrative of a variety of manual and automatic devices which may be used for this purpose. The essential is to provide means for keeping the orifices clear as without such means the distributor will be subject to interruption and disturbance of proper functioning.

Again, even with the provision of a screen, it has been found that fibres of valve packing, fragments of metallic oxides and other solids may collect in the feed tube 21 and interfere with or stop the distribution of the feed stream. To care for this condition, if any, when it should occur, it is desirable to continue the feed tube downwardly to a considerable distance below perforations 23, forming a sediment well or trap as at 45. To the lower portion of the trap is connected a conduit 46, preferably passing through the outer column well 33, the conduit being provided with a manual valve 47. Through this conduit the liquid contained in feed well 21 may be withdrawn at intervals, flushing out any solids collected in the trap. Any gas which may follow will further assist in clearing the trap of sediment.

By opening the expansion valve cautiously, while the nitrogen and oxygen outlets are closed or restricted, any desired pressure, within the limits of safety, may be built up and maintained in the column. Opening valve 47 meanwhile will effectually flush out trap 45.

In order to provide a means for back-flushing the orifices 23 simultaneously with the trap, it is desirable to provide a manually operable valve for closing the inlet of the feed well while the flushing operation is being performed, thus limiting the communication from column to trap to that afforded by the orifices 23, through which the vapor within the column must pass to escape, thus providing an effective, simultaneous flushing of orifices and trap. This means may be of simple construction, as for example a cup-shaped valve 48 arranged to enter the upper end of tube 21 and to seat on a shoulder 49 formed inside the tube below the level of perforations 24. This valve is normally held in an elevated position, as shown in solid lines in the figure, by a stirrup 50 and a pair of levers 51 and 52 coupled to a common shaft, lever 52 being outside the column.

To blow out the sediment trap, the nitrogen discharge 16 is interrupted by closing a valve at some point outside the column, and valve 47 is opened. Lever 52 is then raised, allowing valve 48 to drop to the position indicated by dotted lines, at which the upper end of the feed well is closed. A material part of all the liquid contained in the column will thereafter vaporize and, if desired, the blowing back of the sediment trap may be continued until the column is dry, or it may be interrupted whenever the discharge of sediment ceases.

To prevent liquid flowing from the funnel into the feed well from sidetracking through the upper perforations during operation, an annular tray 53 may be fixed to the feed well.

Figure 6:
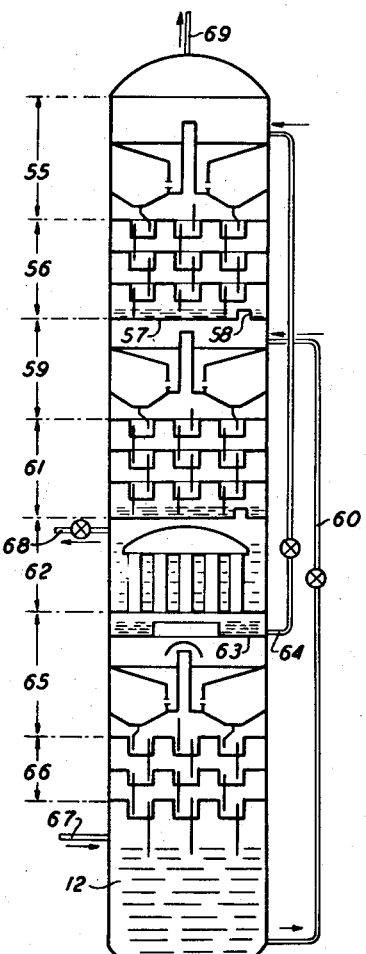
Fig. 6 is an outline diagram of a two-stage column in which the invention may be utilized, this figure illustrating the merger and redistribution of segregated liquid streams.

Under some circumstances, notably where a side stream enters the column, it is necessary to merge all of the segregated streams and to redistribute the merged stream. This situation is illustrated in Fig. 6, showing a two-stage column. As is conventional in columns of this type, high pressure nitrogen, liquefied by the reboiling condenser 62, is passed to the upper end of the column and onto a distributor 55 by which it is divided among the wells on the uppermost plate of low pressure fractionating section 56.

The runbacks from the wells on the lowermost plate of this section are merged in a liquid pool which is illustrated as collected on a blind plate 57 having an opening surrounded by a dam 58 through which vapor passes upwardly and the merged stream flows downwardly onto a second distributor 59 which also receives the side stream of crude oxygen passing up through conduit 60 from the base of the tower. The purpose of the pool is solely to seal the drain tubes from the plate above, which may be individually sealed if preferred. By the second distributor 59, the mixed stream of runback and side feed is divided among the wells on the uppermost plate in fractionating section 61.

The liquid nitrogen produced by the reboiling condenser 62 is in part collected on a tray 63 from which the nitrogen stream above described is carried through conduit 64 to the upper end of the column. The excess over the quantity required to reflux the low pressure plates overflows onto a distributor 65 by which it is divided among the wells on the uppermost plate of high pressure fractionating section 66. The lowermost plate of this section drains into the pool 12 of crude oxygen in the base of the column. Compressed and cooled air is introduced into the column at 67, product oxygen is removed at 68 and gaseous nitrogen at 69, all in the customary manner.

We claim:

1. In a fractionating column, means for dividing a liquid stream into a plurality of lesser streams having a substantially constant volumetric relation, comprising: a substantially circular chamber adapted to receive said stream and having a row of drainage perforations substantially horizontally disposed in its wall; a ring material surrounding and spaced from said chamber and so suspended as to swing relative to the column when said column is rocked, and a resilient wire projected from said ring into each of said perforations, said wire being of less diameter than said perforation to leave an annular orifice for the passage of liquid.

2. In a fractionating column, means for dividing a liquid stream into a plurality of lesser streams having a substantially constant volumetric relation, comprising: a chamber adapted to receive said stream and having a plurality of drainage perforations through its wall; a element passed through each said perforation, said element being of such cross-section as to leave an annular orifice for the flow of liquid, means supporting the elements in the column for movement into and out of the perforations including inertia means movably mounted relative to the column and operatively connected to the elements for moving the elements relative to the chamber responsively to movement of the column.

3. In a liquid-gas contact column having means providing a plurality of separate liquid-gas contact paths and means for introducing at a predetermined rate of flow a liquid stream to the column, a distributor for dividing the introduced liquid stream among a plurality of separate streams and for feeding the separate streams to separate liquid-gas contact paths, comprising an elongated liquid receiving chamber for receiving the introduced liquid stream, means for mounting the chamber in the column with its lower portion above the liquid-gas contact paths and with its longitudinal axis lying substantially along the vertical axis of the column, a plurality of metering orifices in the lower portion of the chamber, each of the orifices having an inlet communicating with the liquid in the chamber and an outlet communicating to without the chamber, the orifices being located in a substantially common plane perpendicular to the vertical axis of the column, means for maintaining a liquid head in the chamber above the orifices at the predetermined rate of flow of the introduced liquid stream, means for maintaining a substantially uniform head acting on the liquid leaving the distributor through each of the orifices, means for conducting gas flowing upwardly from the liquid-gas contact paths past the chamber, and liquid conducting means for conducting liquid flowing from the orifices to separate liquid-gas contact paths irrespective of deviations of the column from a vertical position, the last-named means including a plurality of feed conduits each leading to a separate liquid-gas contact path and each including an inlet located below the plane of the orifices and a plurality of liquid conductors connected between separate orifices and the inlet of separate feed conduits, the liquid conductors each having a liquid conducting wall communicating directly to the outlet of its respective orifice, each liquid conducting wall including a portion of material impervious to upwardly flowing gas displaced from a plane passing through the column perpendicular to its vertical axis, and the liquid conducting means being segregated from each other with respect to liquid.

4. In liquid gas contact column, a distributor for dividing a liquid stream among a plurality of separate descending gas contact paths, comprising: a chamber of substantial depth and having a diameter less than the diameter of the column positioned in the column to receive the stream, a plurality of drainage orifices in the lower portion of the chamber, the liquid flow characteristics of the orifices and the effective liquid holding depth of the chamber being such that with normal liquid flow rates a head of liquid is maintained at all times in the chamber above the orifices but the chamber does not overflow, and means impervious to upwardly flowing gas positioned between the chamber and the column wall for conducting the liquid draining from each orifice to one only of the descending gas contact paths, the chamber having an annular cross section taken in a horizontal plane to permit ascending gas to rise therethrough.

5. In a liquid gas contact column, a distributor for dividing a liquid stream among a plurality of separate descending gas contact paths, comprising: a chamber of substantial depth and having a diameter less than the diameter of the column positioned in the column to receive the stream at its upper end, a plurality of drainage orifices in the lower portion of the chamber, the liquid flow characteristics of the orifices and the effective liquid holding depth of the chamber being such that with normal liquid flow rates a head of liquid is maintained at all times in the chamber above the orifices but the chamber does not overflow, and means impervious to upwardly flowing gas positioned between the chamber and the column wall for conducting the liquid draining from each orifice to one only of the descending gas contact paths, means for conducting upwardly flowing gas past the upper end of the chamber and means forming a communication between the liquid draining from each orifice and within the chamber above the surface of the liquid in the chamber.

6. In a liquid-gas contact column having means providing a plurality of separate liquid-gas contact paths, a distributor of the character defined in claim 3 including means positioned in the column for cleaning the metering orifices.

7. In a liquid gas contact column, a distributor for dividing a liquid stream among a plurality of separate descending gas contact paths, comprising: a chamber of substantial depth and having a diameter less than the diameter of the column positioned in the column to receive the stream, the chamber having an appreciably greater depth than width, a plurality of drainage orifices in the lower portion of the chamber, the liquid flow characteristics of the orifices and the effective liquid holding depth of the chamber being such that with normal liquid flow rates the head of liquid is maintained at all times in the chamber above the orifices but the chamber does not overflow, means for conducting the liquid draining from each orifice to one only of the descending gas contact paths, a solid member positioned for relative movement into and out of each of the orifices, an inertia responsive ring surrounding the chamber and pivotally connected to the column for swinging movement relative to the column upon deviation of the column, and means connecting each solid member to the ring for moving each solid member responsively to deviation of the column.

References Cited in the file of this patent

UNITED STATES PATENTS

| 1,074,913 | Walter | Oct. 7, 1913 |
| 1,183,867 | Grace | May 23, 1916 |
| 1,453,735 | Twining | May 1, 1923 |
| 1,861,284 | Ricketts et al. | May 31, 1932 |
| 2,010,010 | Chillas | Aug. 6, 1935 |
| 2,051,545 | Collins | Aug. 18, 1936 |
| 2,061,830 | Campbell | Nov. 24, 1936 |
| 2,143,877 | Harte | Jan. 17, 1939 |
| 2,394,133 | Zimmerman | Feb. 5, 1946 |
| 2,406,659 | Boyce | Aug. 27, 1946 |
| 2,449,927 | Checkon | Sept. 21, 1948 |